US009742723B2

(12) United States Patent
Orentas et al.

(10) Patent No.: US 9,742,723 B2
(45) Date of Patent: *Aug. 22, 2017

(54) INTERNET PROFILE SERVICE

(71) Applicant: VERISIGN, INC., Reston, VA (US)

(72) Inventors: Leonard Linas Orentas, South Riding, VA (US); Mark Alan Kosters, Clifton, VA (US); David Moston, Manassas, VA (US); Karthik Shyamsunder, Winchester, VA (US); Srinivas Sunkara, Ashburn, VA (US); Eduardo Jimenez, Santa Clara, CA (US); Venkata Pattapu, Ashburn, VA (US); Alexander Holmes, Sterling, VA (US); Andrew Simpson, Sterling, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,973

(22) Filed: Mar. 21, 2016

(65) Prior Publication Data

US 2016/0277354 A1 Sep. 22, 2016

Related U.S. Application Data

(63) Continuation of application No. 12/428,208, filed on Apr. 22, 2009, now Pat. No. 9,292,612.

(51) Int. Cl.
*G06F 15/173* (2006.01)
*H04L 29/12* (2006.01)
(Continued)

(52) U.S. Cl.
CPC .... *H04L 61/1511* (2013.01); *G06F 17/30386* (2013.01); *G06F 17/30598* (2013.01);
(Continued)

(58) Field of Classification Search
CPC ............... H04L 61/1511; G06F 17/30386
(Continued)

(56) References Cited

U.S. PATENT DOCUMENTS

| 6,233,575 | B1 | 5/2001 | Agrawal et al. |
| 7,165,069 | B1 | 1/2007 | Kahle et al. |

(Continued)

FOREIGN PATENT DOCUMENTS

| CN | 1786947 A | 6/2006 |
| CN | 101046820 A | 10/2007 |
| KR | 2007-0098521 A | 10/2007 |

OTHER PUBLICATIONS

Australian Patent Examination Report No. 2 dated Sep. 15, 2014, Australian Patent Application No. 2010234488, pp. 1-3.
(Continued)

*Primary Examiner* — Dustin Nguyen
*Assistant Examiner* — Joel Mesa
(74) *Attorney, Agent, or Firm* — MH2 Technology Law Group, LLP

(57) ABSTRACT

Systems and methods for creating and using a domain profile include identifying a status of a first page associated with a domain. The first page is retrieved and additional pages from the domain are identified based on hyperlinks from the first page. The status of the additional pages is identified and the hyperlinks are prioritized based on the status and/or a comparison with predetermined data. Content is extracted from the first page and selected pages from among the additional pages. The specific additional pages may be selected based on the prioritization. The retrieved content may be processed through a signature marker set to determine a contextual match. A purpose of the domain is determined according to the status of the first page, the status of the additional pages and results of the processing of the (Continued)

content. The domain profile can be displayed, stored, sent and/or searched to identify web sites or attributes of interest.

18 Claims, 6 Drawing Sheets

(51) Int. Cl.
G06F 17/30 (2006.01)
H04L 12/24 (2006.01)
H04L 12/26 (2006.01)
H04L 29/08 (2006.01)

(52) U.S. Cl.
CPC .. *G06F 17/30864* (2013.01); *G06F 17/30887* (2013.01); *H04L 41/12* (2013.01); *H04L 43/08* (2013.01); *H04L 61/2007* (2013.01); *H04L 67/02* (2013.01); *H04L 67/30* (2013.01); *H04L 29/12066* (2013.01)

(58) Field of Classification Search
USPC .................................................. 709/224, 223
See application file for complete search history.

(56) References Cited

U.S. PATENT DOCUMENTS

| | | | |
|---|---|---|---|
| 7,260,837 B2 | 8/2007 | Abraham et al. | |
| 7,280,999 B2 | 10/2007 | Chung et al. | |
| 7,310,686 B2 | 12/2007 | Uysal | |
| 7,546,368 B2 | 6/2009 | Drees et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,814,202 B2 | 10/2010 | Drees et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 2002/0032772 A1 | 3/2002 | Olstad et al. | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2003/0225876 A1* | 12/2003 | Oliver .................... | H04L 41/22 709/224 |
| 2004/0039798 A1 | 2/2004 | Hotz et al. | |
| 2004/0111436 A1 | 6/2004 | Nagai et al. | |
| 2004/0128285 A1 | 7/2004 | Green et al. | |
| 2004/0254926 A1 | 12/2004 | Balogh | |
| 2005/0027882 A1 | 2/2005 | Sullivan et al. | |
| 2005/0076222 A1 | 4/2005 | Olkin et al. | |
| 2005/0105513 A1 | 5/2005 | Sullivan et al. | |
| 2005/0223093 A1 | 10/2005 | Hanson et al. | |
| 2006/0112176 A1 | 5/2006 | Liu et al. | |
| 2006/0282883 A1 | 12/2006 | Rosenberg et al. | |
| 2007/0033275 A1 | 2/2007 | Toivonen et al. | |
| 2007/0070820 A1 | 3/2007 | Gallant | |
| 2007/0073758 A1 | 3/2007 | Perry et al. | |
| 2007/0100808 A1 | 5/2007 | Balogh | |
| 2007/0130316 A1 | 6/2007 | Turakhia | |
| 2007/0192190 A1 | 8/2007 | Granville | |
| 2007/0294419 A1 | 12/2007 | Ulevitch | |
| 2008/0005127 A1* | 1/2008 | Schneider ......... | H04L 29/12594 |
| 2008/0028443 A1 | 1/2008 | Adelman et al. | |
| 2008/0059152 A1 | 3/2008 | Fridman et al. | |
| 2008/0071909 A1 | 3/2008 | Young et al. | |
| 2008/0082662 A1* | 4/2008 | Dandliker ............... | H04L 63/10 709/225 |
| 2008/0086741 A1 | 4/2008 | Feldman et al. | |
| 2008/0091524 A1 | 4/2008 | Yan et al. | |
| 2008/0133729 A1 | 6/2008 | Fridman et al. | |
| 2008/0155254 A1 | 6/2008 | Stradling | |
| 2008/0163369 A1 | 7/2008 | Chang et al. | |
| 2008/0177994 A1 | 7/2008 | Mayer | |
| 2008/0201413 A1 | 8/2008 | Sullivan et al. | |
| 2009/0070453 A1 | 3/2009 | Douglis et al. | |
| 2009/0106211 A1 | 4/2009 | Balogh | |
| 2009/0106390 A1 | 4/2009 | Kirwan, Jr. et al. | |
| 2009/0157889 A1 | 6/2009 | Treuhaft | |
| 2009/0235359 A1 | 9/2009 | Abdulhayoglu et al. | |
| 2009/0282027 A1 | 11/2009 | Subotin et al. | |
| 2009/0282028 A1 | 11/2009 | Subotin et al. | |
| 2009/0282038 A1 | 11/2009 | Subotin et al. | |
| 2010/0030897 A1 | 2/2010 | Stradling | |
| 2010/0077462 A1 | 3/2010 | Joffe et al. | |
| 2010/0138559 A1 | 6/2010 | Sullivan et al. | |
| 2010/0218040 A1 | 8/2010 | Bodmer et al. | |
| 2010/0257266 A1 | 10/2010 | Holmes et al. | |
| 2010/0274836 A1 | 10/2010 | Orentas et al. | |
| 2010/0274970 A1 | 10/2010 | Treuhaft et al. | |
| 2010/0287532 A1 | 11/2010 | Smith et al. | |
| 2010/0318858 A1 | 12/2010 | Essawi et al. | |
| 2011/0022678 A1 | 1/2011 | Smith et al. | |
| 2011/0029662 A1 | 2/2011 | Drees et al. | |
| 2011/0035469 A1 | 2/2011 | Smith et al. | |
| 2011/0035497 A1 | 2/2011 | Daly et al. | |
| 2011/0047292 A1 | 2/2011 | Gould et al. | |
| 2011/0051728 A1 | 3/2011 | Bhogavilli et al. | |
| 2011/0106891 A1 | 5/2011 | Gallant et al. | |
| 2011/0110267 A1 | 5/2011 | Gallant | |
| 2011/0161289 A1 | 6/2011 | Pei et al. | |

OTHER PUBLICATIONS

First Office Action (with English Translation) dated Sep. 5, 2013, Chinese Patent Application No. 201080024769.7, pp. 1-25.
Pal et al., "Supporting Safe Content-Inspection of Web Traffic", CrossTalk—The Journal of Defense Software Engineering, Sep. 2008, pp. 19-23.
International Search Report and Written Opinion dated Jun. 20, 2010, International Application No. PCT/US10/30211, pp. 1-10.
International Search Report and Written Opinion dated Jun. 1, 2010, International Application No. PCT/US10/30214, pp. 1-12.
International Search Report and Written Opinion dated Jun. 4, 2010, International Application No. PCT/US10/30207, pp. 1-9.
Canadian Office Action dated May 2, 2016, Canadian Patent Application No. 2,757,833, pp. 1-3.
Korean Office Action (with English Translation) dated Apr. 11, 2016, Korean Patent Application No. 10-2011-7026116, pp. 1-14.
Extended European Search Report dated Aug. 3, 2016, European Patent Application No. 10762358.9, pp. 1-6.

* cited by examiner

INTERNET PROFILE SERVICE

This application is a continuation application of U.S. patent application Ser. No. 12/428,208 filed Apr. 22, 2009, the entire contents of which are hereby incorporated by reference.

BACKGROUND OF THE INVENTION

As the number of active web sites on the Internet grows, there is an increased demand for organizing and assessing the available content. Search engines have made available information easier for individual users to find and access. Typical search engines may include algorithms that aid in identifying relevant content based on a user's search terms. These may include, for example, taking into account an apparent popularity, based on web traffic, of a particular page with the requested content. However, there are limitations on the capabilities of conventional services that typically download content from a web site, index it, then allow users to search based on the downloaded content.

Understanding the ways in which the Internet is intrinsically organized can be helpful in understanding the challenges related to efficiently utilizing the full scope of information that is accessible via the Internet. The Domain Name System (DNS) is the part of the Internet infrastructure that translates human-readable domain names into the Internet Protocol (IP) numbers needed to establish TCP/IP communication over the Internet. That is, DNS allows users to refer to web sites, and other resources, using easier to remember domain names, such as "www.example.com", rather than the numeric IP addresses, such as "123.4.56.78", assigned to computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g. the "example" level in "www.example.com". Each second-level domain can include a number of third-level domains located immediately to the left of the second-level domain, e.g. the "www" level in "www.example.com". There can be additional level domains as well, with virtually no limitation. For example, a domain with additional domain levels could be "www.photos.example.com".

It should also be noted that a single IP address, e.g., a single server, can support numerous domain names. That is, different domain names may resolve to the same server, that can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part a sequence of segments (conceptually similar to directories, though not necessarily representing them) separated by a forward slash ("/"). This information may be included immediately to the right of the domain name, such as the "blog" in "www.example.com/blog", and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page that may be part of the same, or a different, domain.

Related domain names, and content, may be organized in a hierarchical, or nested, manner, such as "www.example.com"; "www.blog.example.com"; "www.example.com/blog"; or "blog.example.com" etc, each with a different significance. Such related domains need not share similarities in the actual IP address to which the various domain names resolve to. In this regard, part of the domain name may signify a particular server which is desired, for example, "mail.example.com" and "www.example.com" may resolve to different servers, with different functions, for the same second-level domain.

The responsibility for operating each TLD (including maintaining a registry of the second-level domains within the TLD) is delegated to a particular organization, known as a domain name registry ("registry"). The registry is primarily responsible for converting domain names to IP addresses ("resolving") through DNS servers that maintain such information in large databases, and operating its top-level domain.

SUMMARY OF THE INVENTION

The present subject matter can provide benefits in improving the accessibility, and meaningfulness, of domain related content. By taking account of domain features that have not been recognized in a systematic manner, users may search on the attributes of a domain and, in a broader application, a profile may be constructed about a domain's web site using, information that can be publically available via DNS servers and web sites. As used herein, domain features may include, but are not limited to, data content that is part of a web page, data content that is linked to a web page, data content that is part of the DNS resolution support architecture of the web page, etc. Thus, given a domain name, associated information such as attributes and characteristics of the web site may be provided based on an expanded search based on the domain name. The associated information may also provide improved search results based on attributes describing the domain and/or the content of the domain. From these profiles, improved analysis of subsets of the available content on the internet may be conducted that can also be used to improve the efficiency and productivity of individual users, business activities, and web content support services in general.

Embodiments of the present invention relate to systems and methods for analyzing a domain. Embodiments may include identifying a status of a first page associated with a domain. Identifying a status may include attempting to resolve a domain name of the first page and, if the domain name fails to resolve, identifying the status of the domain as non-functional. If the domain name resolves, but content is not accessible, the status may be identified as non-accessible.

If the first page is accessible, the content of the first page may then be retrieved. A plurality of additional pages the domain may then be identified based on hyperlinks from the first page. The status of the additional pages may then be identified, as was the status of the first page. That is, identifying a status of the additional pages may include attempting to resolve a domain name or network address of a first additional page, and, if the domain name or network address fails to resolve, the status of the first additional page may be identified as non-functional. If the domain name resolves, but content is not accessible, the status of the first additional page may be identified as non-accessible, and so on with other pages.

Additionally, the hyperlinks may be prioritized based on the status and/or a comparison with predetermined data. For example, character strings within a URI may be predetermined as having particularly high or low significance. Thus, hyperlinks that contain such strings may be prioritized accordingly. Content may be extracted from the first page and selected pages of the plurality of additional pages. Content may include the full range of domain features discussed herein. The selection of specific pages from among the additional pages may be based on their prioritization.

Content of the first page and additional pages may be processed through a set of predetermined or generated data to determine contextual matches among the content. The predetermined or generated data will be referred to as a signature marker set. A signature marker set should be understood as a table of data that correlates known elements with some other subject. For example, known terms may be associated with a frequency with which the term appears on a sampling of domain names. Comparison of a term found on a page against the term's domain frequency may be a first step in processing the term through the signature marker set. In embodiments, this can help to determine the domain profile more accurately by focusing on terms with a low domain frequency, which may be more discriminating than terms with a high domain frequency. The signature marker set may also use techniques to reduce potential term ambiguity. For example, content may be compared against predetermined data that represents known associations of multiple data content. This can include known textual associations, known data-type associations, and various combinations of like data that is included in domain features. Therefore, the significance of a first object may be more accurately determined by identification of a second associated object in the domain features. As indicated above, domain features can include data from, or linked to, the webpage itself, or DNS information such as the IP address or URI.

Based on the contextual matches, the status of the first page, and the status of the additional pages, a purpose of the domain may be determined. Embodiments may include wherein the content includes executable code embedded in the first page or the additional pages, and the signature marker set is configured to determine a contextual match within the executable code. Embodiments may also include wherein the content includes image, video and audio information embedded in the first page or the additional pages, and the signature marker set is configured to determine a contextual match within the image, video and audio information.

Once determined, the domain purpose may be used in a number of different ways, including searching, displaying, storing and/or sending the determined purpose of the domain. Embodiments may include identifying and retrieving related domains based on the determined status and purpose of the domain.

Embodiments may include determining the purpose of the domain based on at least one of a determined domain name, a registrar reseller marker, an absence of a specified data type, an alternate publisher of the pages, a social community identifier, and a data type, in the content.

Embodiments may also include identifying one or more domains based on their purposes. A category of the identified domains may then be determined that is distinct from the respective purposes of the domains. Related domains may then be identified and retrieved based on the determined purpose and categories of the domain.

Embodiments may include following hyperlinks from the first page by traversing redirects to an https version of the web page.

Embodiments may also include receiving an input set of domains from a user; identifying attributes that are common amongst the input domains from among the contextually thatched content; and outputting the identified attributes to the user.

Embodiments may include receiving an input set of purposes and/or categories from a user; identifying domains that correspond to the input set of purposes and/or categories; and outputting the identified domains to the user.

Embodiments may include performing the described methods in an iterative manner on a range of domains and compiling the results of a historical analysis of the relevant domain space.

Embodiments of the present invention can also include systems for implementing the described methods, as well as computer-readable storage medium coded with instructions for causing a computer to execute the described methods. For example, an electronic system including a processor, a memory and an electronic communication device may be configured to identify a status of a first page associated with a domain, and retrieve the first page, via the electronic communication device; identify a plurality of additional pages from the domain based on hyperlinks from the first page; identify a status of the additional pages via the electronic communication device; prioritize the hyperlinks based on a comparison with predetermined data; extract content from the first page and at least one page of the plurality of additional pages via the electronic communication device, the at least one page of the plurality of additional pages selected based on the prioritization; process the content through a signature marker set to determine a contextual match; determine a purpose of the domain according to the status of the first page, the status of the additional pages and results of the processing of the content; and at least one of display, store and send the determined purpose of the domain.

Further advantages of the present subject matter will become apparent to those of ordinary skill in the art upon reading and understanding the following detailed description of the preferred embodiments.

DETAILED DESCRIPTION OF THE INVENTION

Embodiments of the present invention can help a user, web content provider and/or registry understand how domain names are purposed. A holistic view of on-line activity by industry segment can be constructed to improve understanding of the online environment and to complement other micro-analytic tools. Thus, the systems and methods described herein may generate results that can provide domain site-purposed data.

Given a domain name, the described systems and methods can derive attributes/characteristics about the web site accessible through the domain name. The service can also allow users to search for domains based on criteria that may include several attributes describing the domain or the content on the domain. Embodiments can use information contained in publicly available DNS Servers and content available in publicly available websites to build a profile about a domain's web site.

Figure 1:
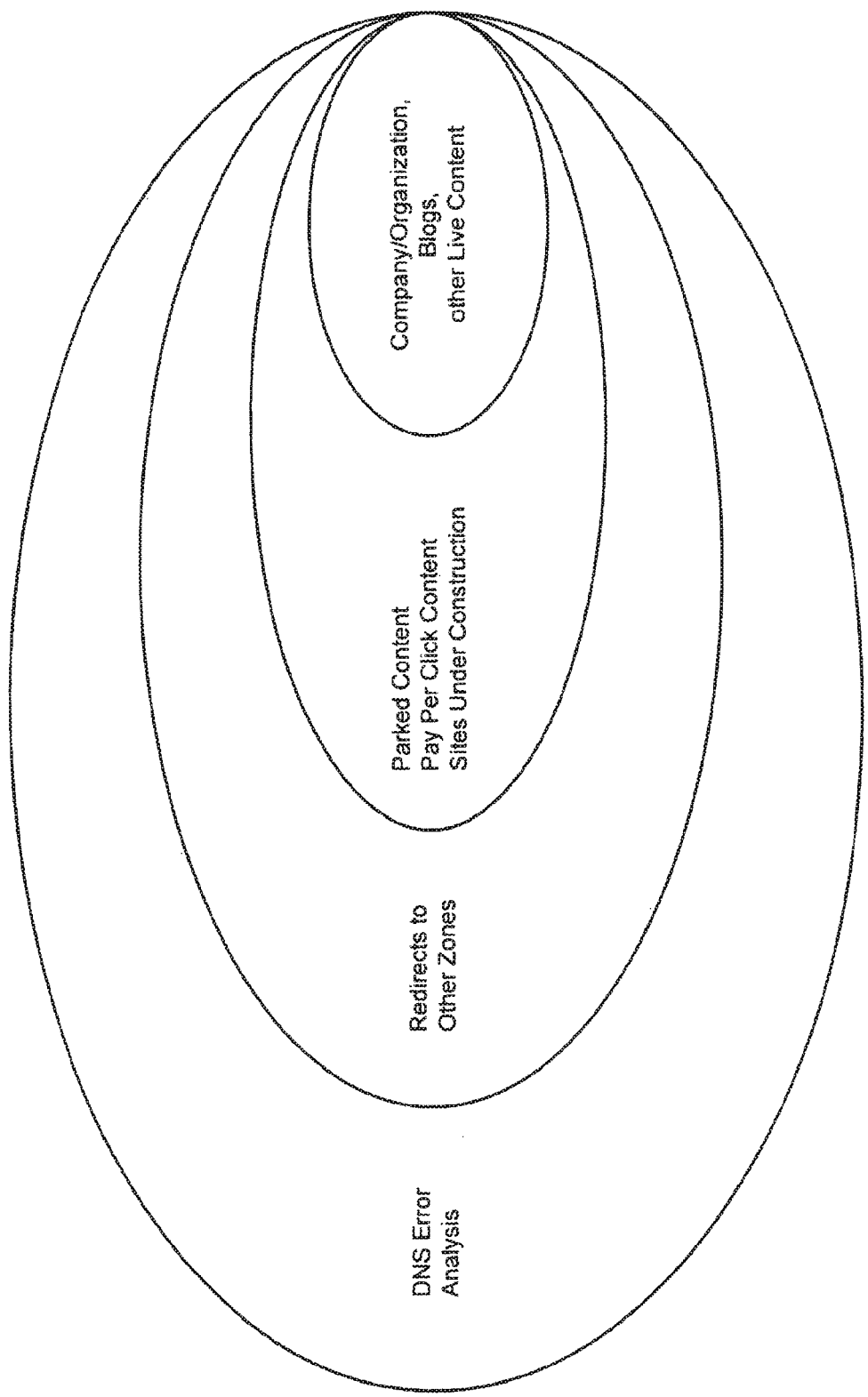
FIG. 1 depicts an exemplary system in accordance with an embodiment of the present invention.

Embodiments can collect and provide different types of data associated with a domain in a layered fashion, for example as depicted in FIG. 1. Embodiments can determine a domain status by attempting to load a web page, and determining a domain purpose and domain categories by collecting textual, or other, data from a website and passing it through a signature marker set.

The systems and methods attempt to collect information regarding the following exemplary attributes with respect to a domain's websites: Domain Status; Domain Purpose; Domain Categories; Domain Traffic, Domain Key Terms, Domain Property/Features/Function, and Domain Content. These attributes are described further below. Through the described data collection and analysis, embodiments of the present invention can also provide an improved directory of TLDs, such as the .com and .net TLDs, and an overview of their use for website hosting. For example, by determining domain profiles for all, or a subset, of the domains within a TLD, an improved directory can be created that classifies the relevant domains according to patterns that exist across the domain-space, rather than categories that are determined and applied according to individual web page content. This may provide previously unrecognized advantages in managing various levels of Internet architecture and services. For example, by determining a status, purpose and categories of a domain, rather than individual web pages alone, individual users, content providers and registries are able to better appreciate the relevance of content and recognize patterns that directly relate to marketing and other significant aspects of the various uses of the Internet.

Figure 2:
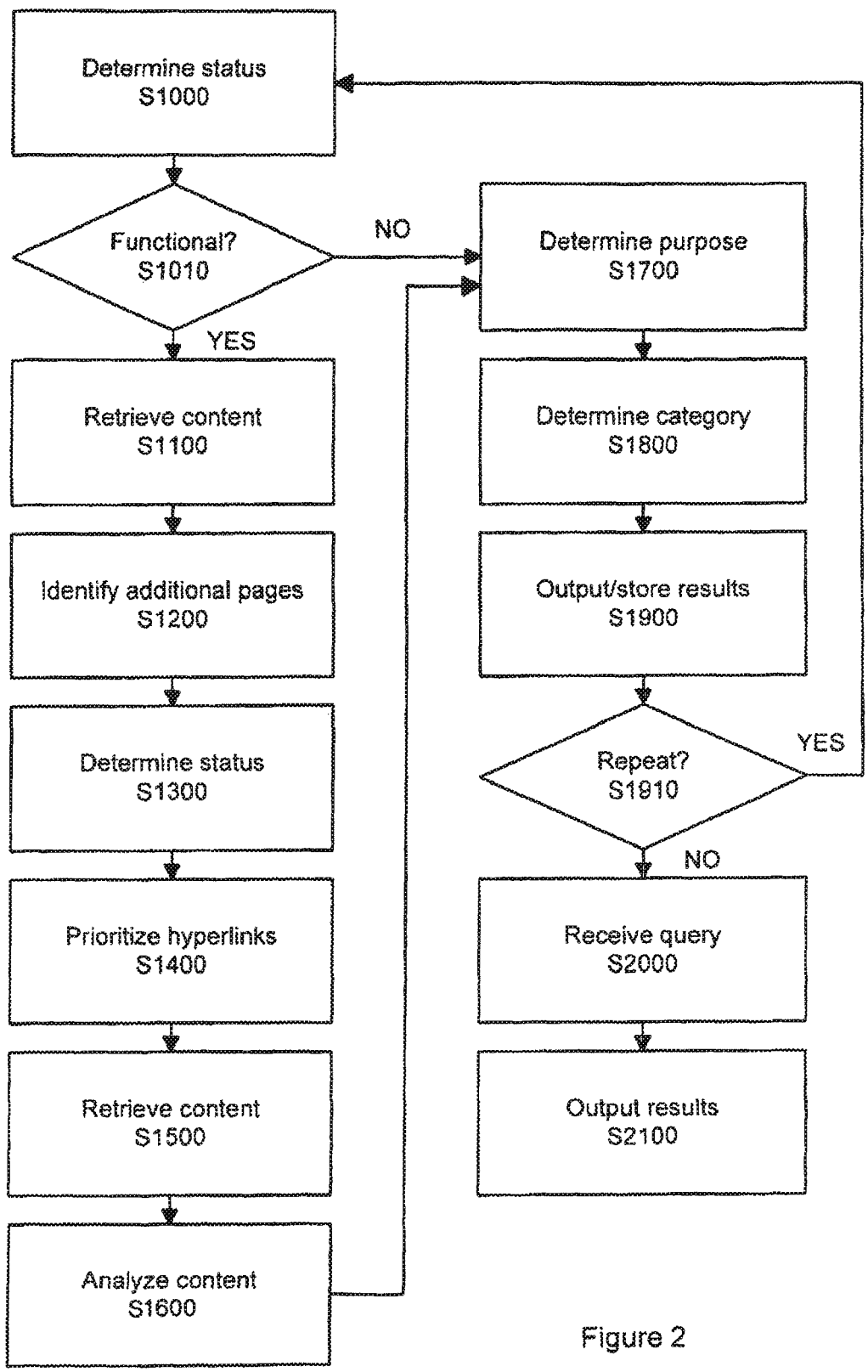
FIG. 2 depicts an exemplary method in accordance with an embodiment of the present invention.

The following exemplary method is described with reference to FIGS. 2 and 3. As depicted in FIG. 2, the method may begin with step S1000, in which a status of a first page is determined. Domain status generally relates to whether and how a domain resolves. For example, it can be determined whether there is a web server associated with the domain, and, if so, whether the web server can be contacted. Further information may include if there are any specifically identified web server errors. For example, a domain name is input and transmitted to a DNS server to attempt to resolve the domain name. If the domain name fails to resolve, the status of the domain may be determined as non-functional. If the domain name resolves, but content is not accessible, the status may be identified as non-accessible. Other status identifiers are also possible.

Domain Status may indicate the operational status of the associated website, e.g. active, HTTP error, etc. The domain status may indicate whether a website is accessible from a particular domain, and if not, at what stage attempting to access that website fails. Access failures may include error codes assigned to the domain web site such as those indicated in Table 1.

TABLE 1

Domain Status

| Status Title | Status Description |
| --- | --- |
| Does Not Exist | No name servers found. |
| Name Server Error | The Name server cannot translate the domain request into internet (IP) address. |
| Name Server Timeout | The Name Server does not respond in a designated period of time, or after a designated number of attempts. |
| HTTP Error 4XX | The webservers are responding with a content error. |
| HTTP Error 5XX | The webservers are responding with a server error |
| Robots Disallowed | The server is denying crawlers access |
| Cannot Contact Host | The webservers are not responding |
| Unknown Web Error | The servers are responding with an unknown error message |
| Ok | The server is reachable and responding with content |

If one or more queries of the domain results in an non-functional or otherwise inaccessible error, the method proceeds at step S1010 to step S1700, where a purpose of the domain is determined based on the determined status. For example, a status code, such as a name server error, may be used to determine a general non-functional purpose or a more specific non-functional purpose related to the error code.

If the domain name resolves, but results in a redirection, this may be included in determining the status of the domain. For example, the status may be determined to be a "redirect" domain, without active content.

Figure 3:
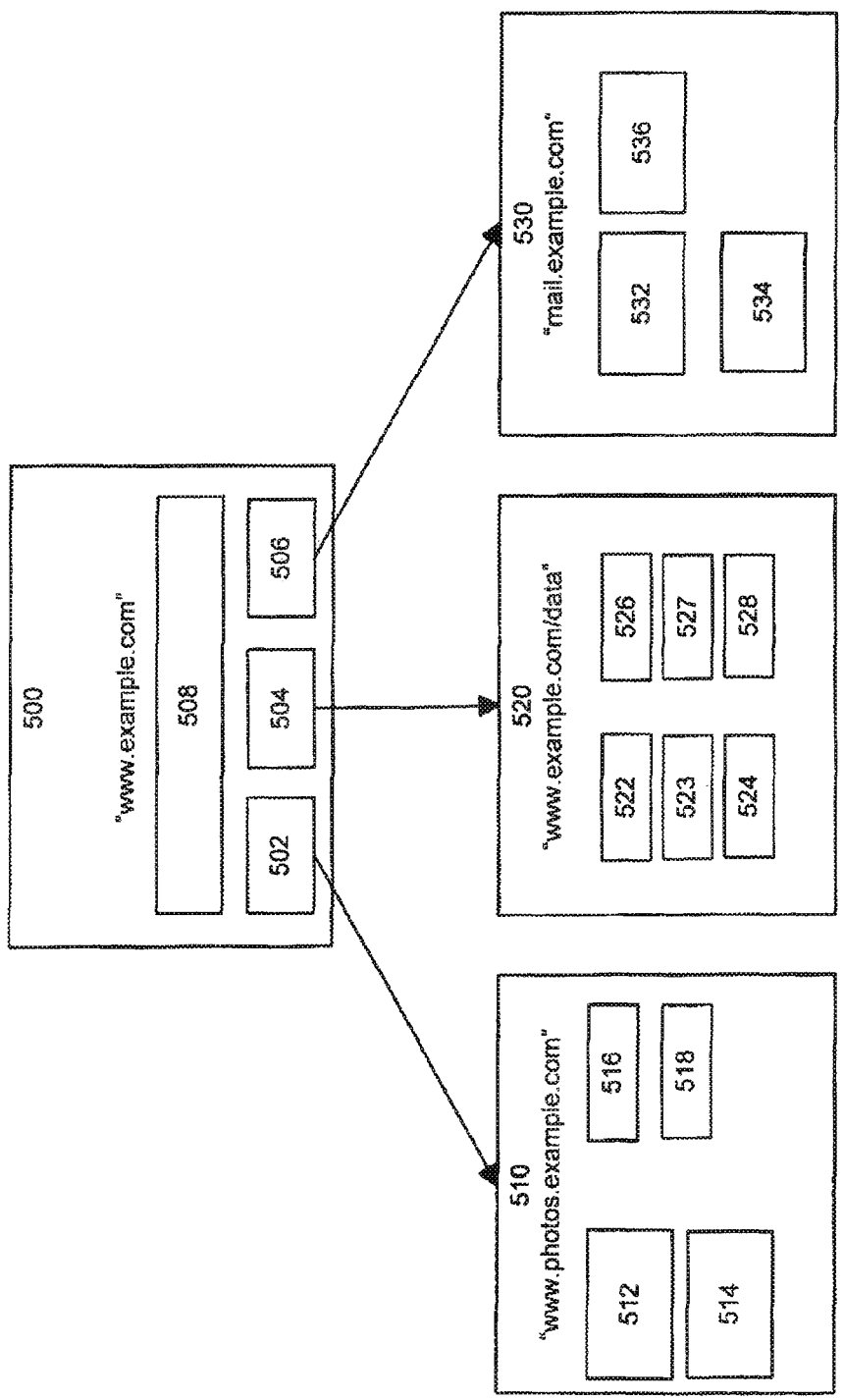
FIG. 3 depicts an exemplary web page, and related content, in accordance with an embodiment of the present invention.

If the web server for the domain name is successfully connected to, and does not result in being redirected, the content of a first page 500, an example of which is depicted in FIG. 3, may then be retrieved in step S1100.

In step S1100 content from the first page, e.g. elements 502, 504, 506, and 508, is retrieved. This content can be in various forms known to those of skill in the art, including, for example, text, multimedia, hyperlink, or other executable code. By way of example, elements 502, 504 and 506 may be web page buttons that activate hyperlinks to web pages 510, 520 and 530 respectively. Element 508 may be text, image, or other multimedia data content. The content may be used for at least two purposes described herein. One purpose can be to identify any other pages that are associated with the first page, for example, accessible through the first page, based on hyperlinks embedded in the first page, e.g. elements 502, 504, 506. This function may be performed in step S1200. That is, a plurality of additional pages, e.g. 510, 520, 530, may be identified based on hyperlinks detected in the first page, it should be noted that although exemplary pages 510, 520 and 530 share a same second level domain, other pages that are associated with, e.g. hyperlinked from, page 500 need not necessarily share the same domain. Another purpose of the content can be to assist in determining the purpose of the domain, which is discussed further below. The method continues with step S1300.

In step S1300, the status of the additional pages, e.g. 510, 520, 530, may be identified. Identifying a status of the additional pages may include attempting to resolve a domain name or network address of a first additional page, and, if the domain name or network address fails to resolve, the status of the first additional page may be identified as non-functional. If the domain name resolves, but content is not accessible, the status of the first additional page may be identified as functional, but non-accessible. Other status identifiers are also possible, as discussed above with respect to determining the status of the first page 500. The method continues with step S1400.

In step S1400, the identified hyperlinks and associated additional web pages may be prioritized based on a comparison with predetermined data. For example, hyperlink data, including domain, and non-domain URI information, may be compared to predetermined markers, such as lists of significant keywords, strings or other values, that suggest desired content. The structure of the hyperlink data may also be analyzed as part of the process to recognize patterns of information, e.g. particular nesting formats etc. As a result, a prioritized list of the identified hyperlinks may be produced.

A user may select the particular markers to use in order to customize the prioritization. This may include presenting the user with a list of markers that have been recognized in the identified hyperlink data, and allowing the user to select among these markers. To further assist the user, the user may be provided with optional additional information relevant to the recognized markers. For example, each of the recognized markers may be given a quantitative or qualitative value that assists the user in evaluating which markers are of most significance to the user or the domain in question. For example, the user may have a particular interest in certain identified markers, or a set of markers may appear to be more relevant based on a quantitative value of the presence of the marker in the hyperlink data. Thus, the user may select from the markers based on additional predetermined information relating to the particular markers that is presented to the user. This can provide benefits in identifying more pertinent webpages from which to extract content from as part of the domain profiling. The method continues with step S1500.

In step S1500, additional content may be extracted from the first page 500, such as content 508, if needed and content may be extracted from selected pages of de plurality of additional pages. The selection of specific pages from among the additional pages may be based on their prioritization. For example, if additional pages 510, 520 and 530 are prioritized such that page 530 is lowest in priority, content may only be gathered from pages 510 and 520. In embodiments, page 530 could be designated as low priority based on the text string "mail" within the domain name. This may conserve resources and also lead to more accurate results in later steps by identifying the most relevant additional pages and content. The type of content gathered may also be determined based on parameters of the signature marker set discussed further below. For example, text content may be all the data needed if the signature marker set is configured for text only. This discrimination may also provide efficiency in large-scale data gathering and analysis. If the signature marker set is configured to process multiple data types, this may improve the overall accuracy of the analysis.

Following the hyperlink data from the first page may also include traversing redirects. For example, hyperlink data may not resolve directly to another web page, but instead may require at least one redirect. Thus, the "additional pages" may be indirectly linked or associated with the first page. This may also include traversing redirects to an https version of the web page. The method continues with step S1600.

In step S1600, the content gathered from the first page and the additional pages may be processed through a signature marker set to determine contextual matches among the content. As discussed above, a signature marker set may include linked data elements that provide a contextual match, or significance, for one of the data elements. By identifying contextual matches of the content gathered, appropriate weight may be given to the significance of various portions of the content. For example, while the term "Ford" is an automobile manufacturer, it is also a common surname, and, by itself, is of uncertain significance. This may result in improperly considering or disregarding this term as part of web page content. Term disambiguation may require "Ford" and other identified automotive terms to be within close proximity for the use of the term "Ford" to be considered related to the automotive class. N-gram models are a type of probabilistic model for predicting the next item in a sequence. N-grams are used in various areas of statistical natural language processing and genetic sequence analysis, and may be applied to the present subject matter to refine the content processing described herein. For example, an n-gram model predicts $x_i$ based on $x_{i-1}, x_{i-2}, \ldots, x_{i-n}$. As described above with respect to the markers used for prioritizing the hyperlink data and additional pages, the method may allow the user to select the desired association from among identified associations. For example, the user may identify certain identified contextual matches as valid, and other contextual matches as invalid, or to be ignored. Additionally, the methods may assist the user in identifying the significance of contextual matches by providing additional quantitative or qualitative information in conjunction with the contextual matches. Thus, automated methods may be used to assess the weight given to the contextual matches, as in the case of predetermined signature marker sets that are automatically applied to extracted content, or may assist the user in doing so, as in cases where the user is allowed to accept, weight or rejects identified contextual matches.

With respect to the signature marker set, the particular types of data that are processed from the content are not limited to text or other specific data. For example, embodiments may include wherein the content includes executable code embedded in the first page or the additional pages, and the signature marker set is configured to determine a contextual match within the executable code, or within results of the executable code. Embodiments may also include wherein the content includes image, video and/or audio information embedded in the first page or the additional pages, and the signature marker set is configured to determine a contextual match within any of the image, video and audio information. For example, there may be contextual matches amongst various audio data such as pattern recognition results, audio type, audio length, or any number of related attributes. A large number of similarly patterned audio information may be a strong indicator of a particular type of web page, e.g. directed to a particular musical artist's content, and thus be of particular significance.

In the case of both the hyperlink markers and the signature marker set, a Marker Performance Report may be included to provide improved performance. For example, a user may be presented with a qualitative assessment of the performance of individual markers. Alternatively, or in conjunction with the automated assessment, the user may independently assess and rank the effectiveness of the markers. Therefore, the system may ensure that the markers used are effective by providing a report on the marker performance, and allowing for changes in the use of the markers. The report may be presented to a user, who may implement changes, or the system may be automated to discard poorly performing markers such as those that fall below a certain threshold. After processing the content, the method continues with step S1700.

In step S1700, a purpose of the domain may be determined based on the status of the first page, the statuses of any additional pages, and any results of the contextual matching. Domain purpose can relate to the theme or overall meaning or intended use or uses of the content associated with the domain. The purpose may reflect an apparent reason for which a domain is used. In the case of domains that fail to resolve, or return other access errors, the purpose may be that the domain is not being used, or is restricted. Other identified purposes may include Pay Per Click (PPC) Parking, Purposed, Masked Redirection, Redirection, Blogging etc. as detailed in table 2 below.

The results of the contextual matches can be particularly effective in determining specialized purposes of active domains. The accuracy of this assessment is improved by the additional analysis of the prioritized additional pages. Thus, functioning web sites may be assigned non-exclusive purpose codes such as those identified in Table 2 and any other suitable codes to designate other purposes.

TABLE 2

Purpose

| Title | Description |
| --- | --- |
| Blocked | The domain does not allow robots to crawl. |
| PPC Purposed | Domain names registered for the sole intent to drive advertising traffic (by the operator or registrant of the domain). |
| PPC Parked | Existing domain name that has not been set up by the end user registrant and the registrar has repurposed the parked name to drive revenue traffic. |
| Parked | The domain name is using a traditional registrar parking with no advertising links. |
| Under Construction | The domain name is under construction with no advertising links. |
| Redirected | The domain redirects to another domain. |
| Masked Redirected | The domain is displaying only content from another site |
| Adult | The domain is displaying content meant for adults-only |
| Company/ Organization | The domain name is being used to provide information about a company or organization. |
| Blog | The domain name is used primarily for blogging. |
| News | The domain is aggregating and displaying news |
| E-Commerce | The domain is being used to sell products online |
| Forum | The domain is primarily used to discuss various related topics by users |
| Social Networking | The domain is primarily used to facilitate brining like-minded individuals together |

Additional information may also be included in the purpose determination. For example, measures of domain traffic, such as statistics primarily from a DNS Traffic Processor, may be included to assess whether a web site is an authentic retail site. Domain key terms, such as headline, title and description, may also be given specified weights in addition to the contextual match weight factor described above. Domain properties, features, and/or functions indicating whether common features are present on the website and additional pages may be used in determining a purpose, such as blogging, retail, etc.

It may also be advantageous to consider technical details of the content in determining the purpose. For example, identifying what type of technology the websites use, e.g. mail servers associated with the domain, cookies, multimedia, SSL certificates to secure data, etc., can provide indications of purpose, such as retail versus personal or other purposes. Additional technical data beyond specific content may also be indicative, such as the average time to render the content on the relevant pages, geographical location of the web server, etc.

Embodiments may include determining the purpose of the domain based on at least one of a determined domain name, a registrar reseller marker, an absence of a specified data type, an alternate publisher of the pages, a social community identifier, and a data type, in the content. That is, the presence, or absence, of particular content, such as that listed above, may have independent significance in establishing an overall purpose of the domain. Examples may include indications of advertiser information, or the lack thereof, or data types such as image data, or the lack thereof. Once the domain purpose is determined, the method continues with step S1800.

In step S1800, a category of the domain may be determined that is distinct from the respective purposes of the domain. A Domain Category may reflect a category associated with a business segment related to the content on the site. This may involve determining to which categories the content from the first page and the additional pages belongs. For example, the Domain Category may place the domain into a system of business classification taxonomy in conformance with the North American Industry Classification System. Table 3 is a partial list of exemplary categories, which may include an assigned prioritization of the categories within the category code.

TABLE 3

| Category Code | General Category | Detail Terms in the Category Segment | | |
| --- | --- | --- | --- | --- |
| 1 | Pharmaceutical | | | |
| 1A | | Drug Stores | | |
| 1B | | Drugs/medicine | | |
| 1C | | Pharmacy | | |
| 2 | Fitness | | | |
| 2A | | Exercise | Yoga | |
| 2B | | Diet & Nutrition | Diets | Meals |
| 2C | | Services | | |
| 2D | | Review sites | | |

The information used to determine the Domain Category may include the content obtained from the first page and the additional pages, and may even be the same content used to determine the Domain Purpose. However, the significance attributed to various information may be different in each process. For example, as discussed above, the presence of "Ford" with other contextual corporate-related information may be used to determine a COMPANY/ORGANIZATION purpose of the web page. The presence of the same information "Ford" with other automotive information may also be used to determine a Domain Category in the automotive arts.

As with the determination of Domain Purpose, the Domain Classification is not limited to the content of a particular web page. Rather, the Domain Classification may be derived from the content of the first page and the prioritized additional pages, to arrive at a comprehensive classification of the domain. Embodiments may also include identifying one or more domains based on their purposes before performing the classification of the domains. This may provide advantages in accurately categorizing such domains into a classification, with or without user interaction.

As discussed embodiments of the present invention, the features of a Domain Purpose and Domain Categories can be distinct. That is, Domain Purpose may include the purpose of the website associated with the domain, e.g., news, blog, parked, etc. The Domain Purpose can be the primary purpose of a domain's website. This purpose can relate to the content of the particular website, and not necessarily the company owning it. That is, the corporate website of a given company can have a different purpose than, for example, a promotional blogging site for the company.

After the Domain Categories are determined, the exemplary method may proceed at step S1900 with at least one of storing the results to a computer-readable storage medium, displaying the results to a user, or otherwise electronically communicating the results to a requestor over an electronic communication network. Embodiments may further include performing targeted searches within the saved data, and/or performing the described methods in an iterative manner on a range of domains and compiling the results for historical analysis of the relevant domain space, as discussed further below.

Figure 4:
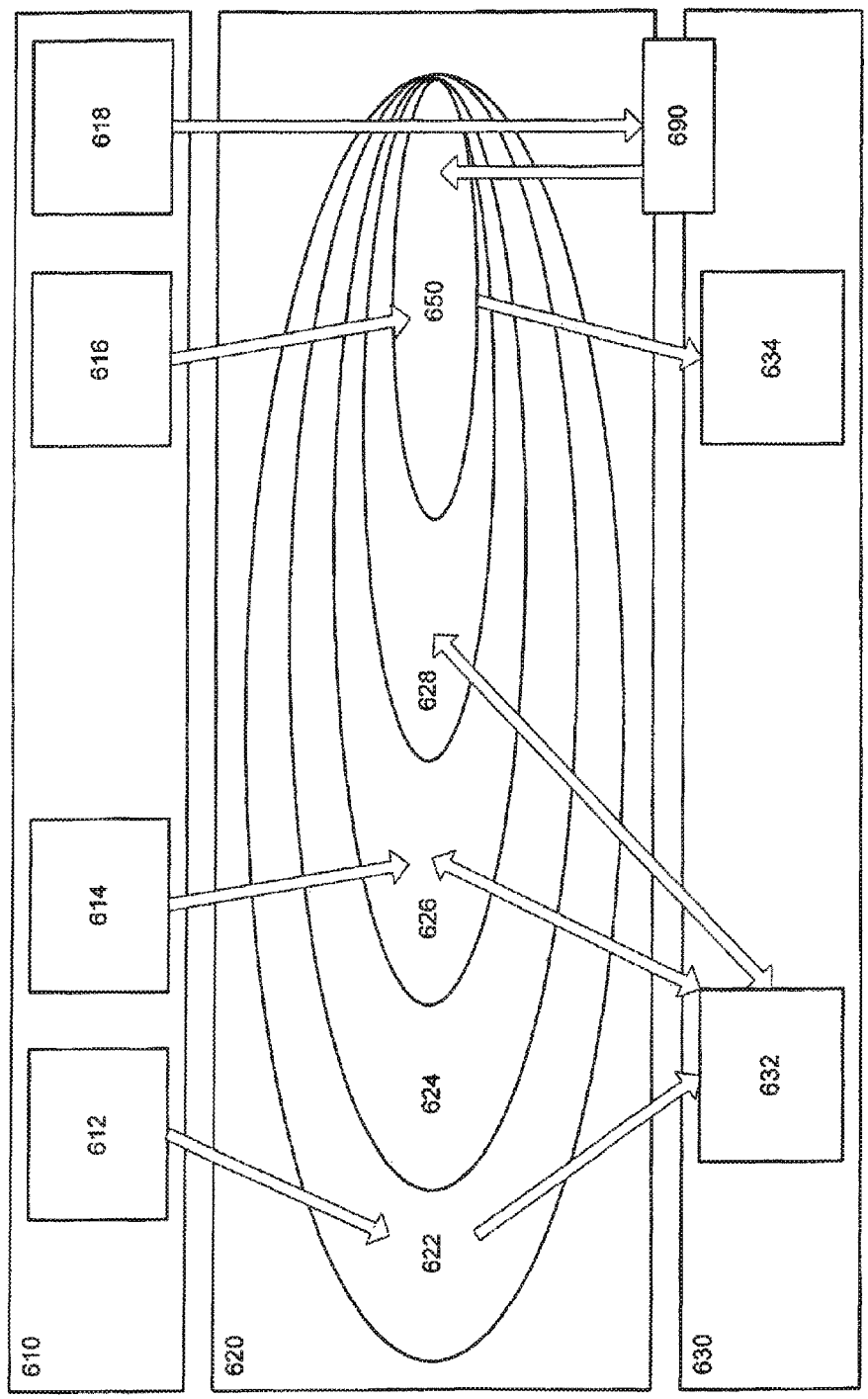
FIG. 4 graphically depicts an exemplary layered data resolution in accordance with an embodiment of the present invention.

FIG. 4 depicts an example of a high-level process flow form monthly iterative cycle in accordance with embodiments of the present invention. It consists generally of inputs 610, components 620, and outputs 630. Additional tools 690 may also be included. Such additional tools may assist a user in performing various selections/inputs 610, e.g., prioritizing identified hyperlinks, terms etc. The inputs may include, for example, a zone file 612, a Signature Marker Set 614 and a Training Set 618. In embodiments, a user may input or select, items within the signature marker set 614 and/or the training set 618. The Components may include a Web Crawler 622 and an Analyzer 624. The Analyzer can be functionally split into to Categorization 626 and Classification 628 parts. A registry 616 may maintain the various processes (inputs, components and output), and implement them on a designated portion of web space 650 in order to better understand relevant online activity by industry segment. For example, the registry may collect all the DNS traffic from a given server. Data for all sub-domain names for a TLD may be collected periodically and kept for a period of time in file storage 632. Reports 634 may also be generated based on a method including the training set 616 working in cooperation with the additional tools 690 to process information from the designated portion of web space 650. This can provide a DNS traffic value, and Domain Status, Purpose and Categories for each domain name over a period of time and provide access to information that has not been available in the past.

Embodiments may also include receiving as part of a query in step S2000 an input set of domains from a user for analysis. The system may automatically identify attributes that are common amongst the input domains. These attributes may be from among the contextually matched content or other gathered information. The results or this analysis may include outputting the identified common attributes to the user in step S2100. This capability may provide advantages such as being able to automatically identify common purpose-related attributes of domains, including the additional identified pages.

Embodiments may also include receiving as part of a query in step S2000 an input set of purposes and/or categories, e.g. from a user. Domains that correspond to the input set of purposes and/or categories, based on the described methods, may be identified, and the identified domains output to the user in step S2100. This capability may be advantageous in providing improved classification and identification of relevant information and/or domains that would not be possible merely from conventional methods of analyzing web page content. The described methods can provide for prioritizing and parsing downloaded content, identify and collect significant attributes about the domain, including various categorizations of direct and indirect content, and can allow users or administrators to search based on the attributes of the domain.

Figure 6:
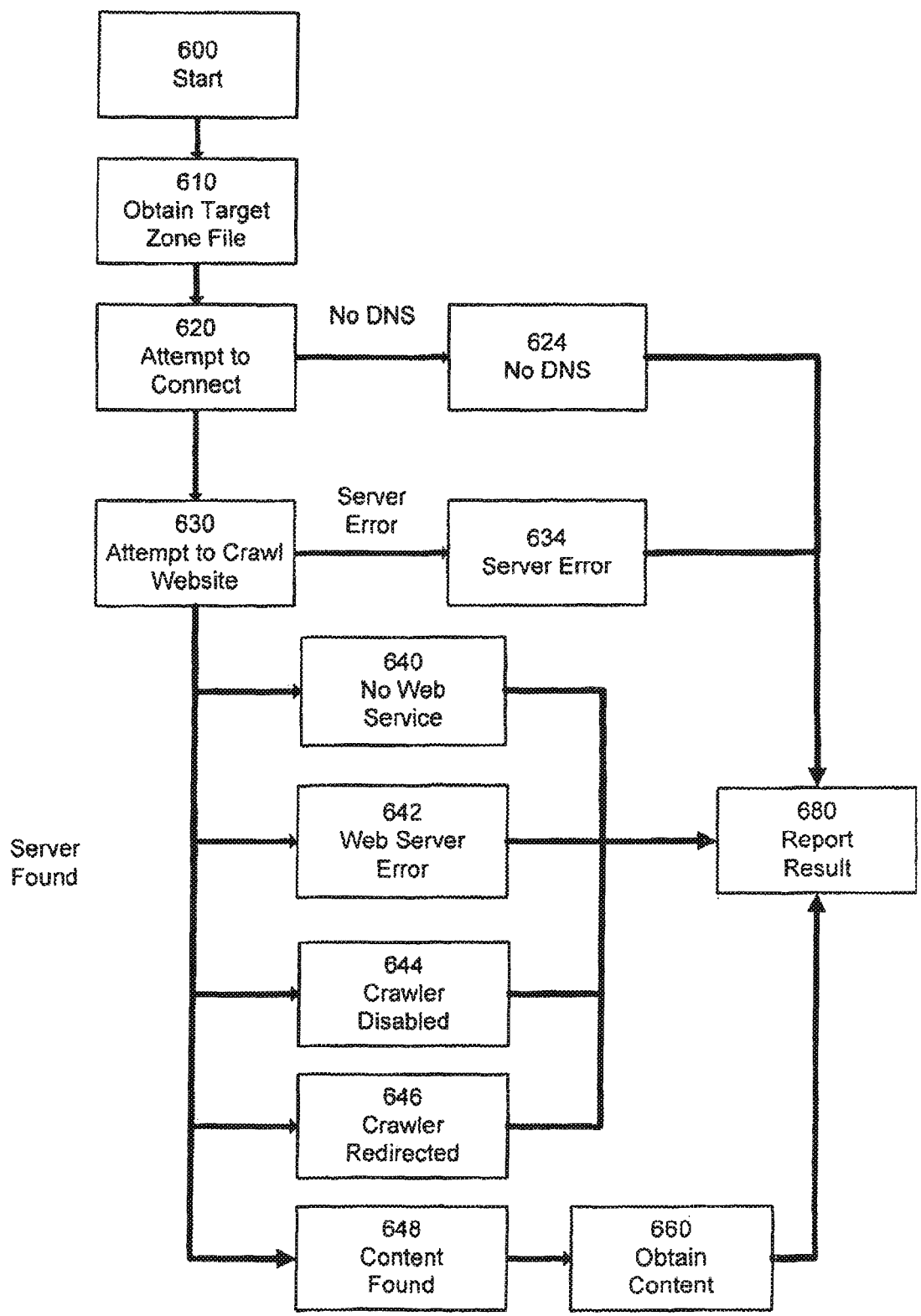
FIG. 6 depicts aspects of an exemplary method in accordance with an embodiment of the present invention.

Additional details regarding an exemplary process flow are provided in FIG. 6. As shown in FIG. 6, the process may start at S600 and proceed to S610, where a target zone file is obtained. For example, the target zone may be a designated domain as discussed herein. The method proceeds to S620.

In S620, the process attempts to connect to the target zone, which may be a designated domain. Different types of errors may result based on the attempt to connect to the target zone. For example, there may be a lame delegation, in which the DNS server is inoperable. If no DNS is identified, or other errors similar to those described above occur at S620, the method proceeds to S624, which is referred to as a "No DNS" error. Based on this determination, a status may be reported at S680.

If the attempt to connect to the target zone is successful, the method continues to S630. A successful attempt may include a requested domain name being resolved by the DNS server to an IP address. However, there are errors that can occur at the web server level that may prohibit obtaining content from the requested address. For example, in S634, a server error may be identified, such as the name server timing out, or otherwise indicating an error associated with the server in response to the request to connect to the IP address. If a server error is indicated at S634, the method may proceed to S680 where the error may be reported.

If a server is found by the server during S630, the method may proceed to S640-648, where various responses may be received based on the attempt to crawl the designated web site or address. This may include an indication that the requested domain does not have an active web site, as in S640. There may also be an error with the web server responsible for the website that is indicated after the server is found, as in S642. The server or website may also restrict the ability of the web crawler to retrieve content, as in S644, or redirect the web crawler to another site, as in S646. These, and other responses that represent less than full access to the content of the web site, may be reported in S680.

If the web site is accessed and content is available, the method may proceed to S648, where content from the web site is recognized as found. As described further herein, once content from a web site, or target domain, is found, the method may continue by accessing and analyzing the found content, as in S660. The results of the content retrieval and/or analysis may be reported in S680.

The methodology depicted in FIG. 6 can thus result in a number of various reports in S680 depending on the extent to which the method progresses through the steps of attempting to access the target zone. Some of these may reflect non-functional status of a domain, as in the case of DNS or web server errors, or additional status, purpose and categories depending on the amount and type of information, including content, obtained during the process.

Figure 5:
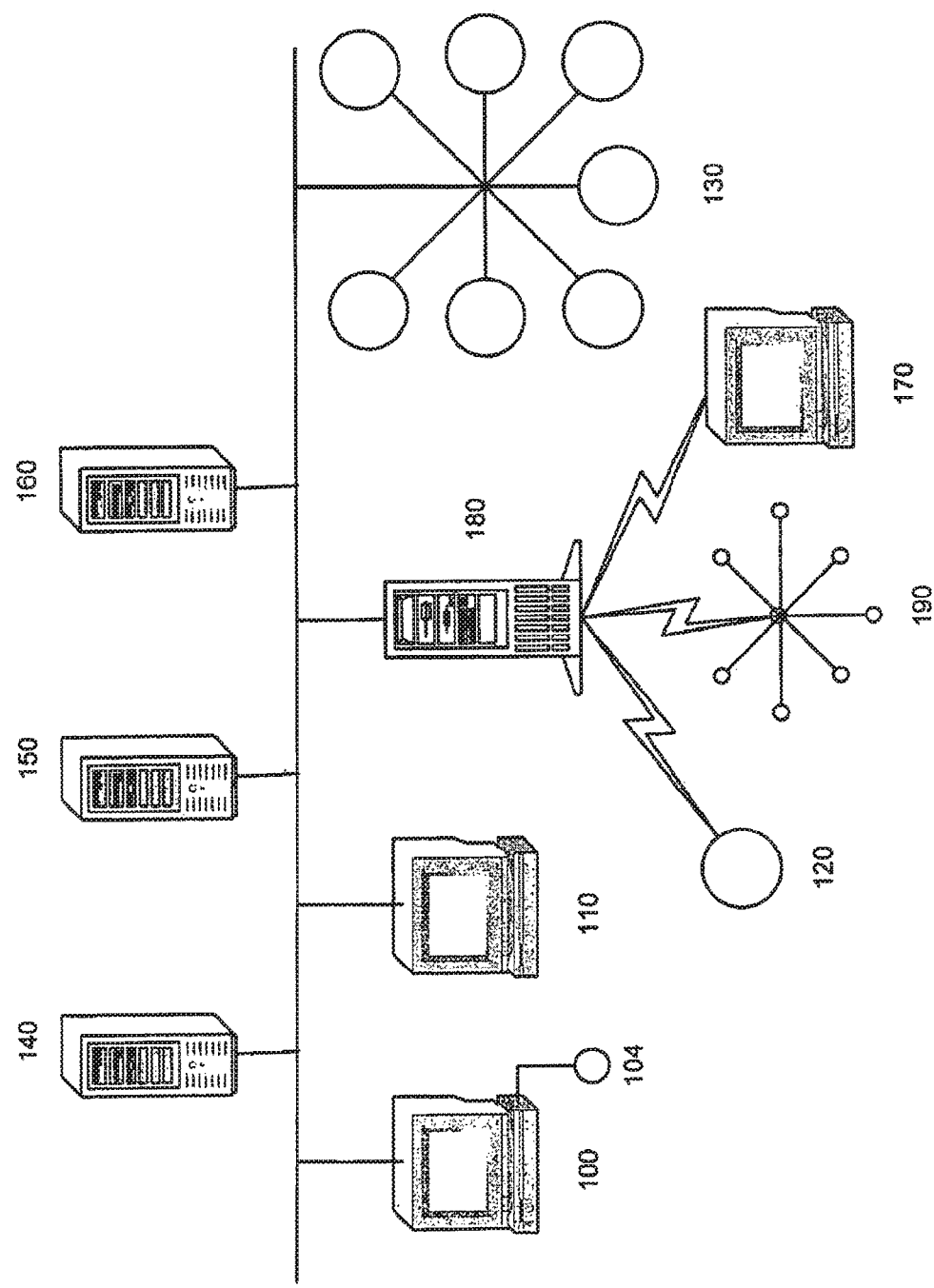
FIG. 5 graphically depicts an exemplary process flow in accordance with an embodiment of the present invention.

Embodiments of the present invention can include systems for implementing the described methods, as well as computer-readable storage medium coded with instructions for causing a computer to execute the described methods. For example, as shown in FIG. 5, an electronic system 100 including a processor, a memory and an electronic communication device may be configured to identify a status of a first page associated with a domain via DNS server 140. The system 100 may be represent a user computer system, wireless communication devices such as 120, 170, subnetworks such as 130, 190, a server, or any other networkcapable device with the requisite functional capabilities. System 100 may operate as part of, or separate from, a DNS server associated with a registry.

The first page may be received by the system 100 from server 150 via the electronic communication network 170, such as the Internet. The system 100 may identify a plurality of additional pages from the domain based on hyperlinks from the first page. The system 100 may then identify a status of the additional pages via the DNS server 140. The system 100 may also prioritize the hyperlinks based on a comparison with predetermined data, as discussed above. Content from the first page and at least one page of the plurality of additional pages may be extracted via the servers 150, 160, for example from web-hosting servers. The system 100 may then process the content through a signature marker set, that is stored on or otherwise electronically accessed by the system 100, to determine a contextual match.

The system 100 can further determine a purpose of the domain according to the status of the first page, the status of the additional pages and results of the processing the content. The system 100 may receive the various user inputs described above, such as selecting identified web pages from which to extract data content, selecting terms, and The results of the described processing performed by system 100 can be displayed, stored and/or sent according to known techniques.

The system 100 includes any number of processors (not shown) that are coupled to storage devices including a first storage (not shown, typically a random access memory, or "RAM"), second storage (not shown, typically a read only memory, or "ROM"). Both of these storage devices may include any suitable type of the computer-readable media described and/or mentioned above. A mass storm device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The system 100 may also include an interface that includes one or more input/output devices such as such as video monitors, track balls, mice 104, keyboards, microphones, touch-sensitive displays, transducer card readers, magnetic or paper tape readers, tablets, styluses, voice or handwriting recognizers, or other known input devices, including other computers 110. The system 100 may be coupled to a computer or other electronic communication network 170, 180 using a network connection as shown generally at 101. The network can connect various wired, optical, electronic and other known networks to exchange information among computers 110, servers 160, wireless communication devices 120, 170 and sub-networks 190, 130. With such a network connection, it is contemplated that the system 100 and the processor therein may receive information from the network, or may output information to the network in the course of performing the above-described method steps. The above-described devices and materials will be familiar to those of skill in the computer hardware and software arts and need not be individually or exhaustively depicted to be understood by those of skill in the art. The hardware elements described above may be configured (usually temporarily) to act as one or more modules for performing the operations described above.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. A computer-implemented method, comprising:
   receiving a first webpage associated with a domain;
   determining a plurality of additional webpages associated with the domain based on hyperlinks in the first webpage;
   extracting content from the first webpage and the plurality of additional webpages;
   determining technical data associated with the first webpage and the plurality of additional webpages;
   processing the content and the technical data through a signature marker set to determine a contextual match;
   determining a purpose of the domain based on the contextual match;
   determining, based on the content, a category associated with the domain, wherein the category is distinct from the purpose and defines a commercial sector of the domain;
   generating a domain profile for the domain, wherein the domain profile comprises an indication of the purpose of the domain and an indication of the category associated with the domain;
   storing, in a memory, the domain profile;
   receiving a query comprising at least one of a purpose and a category;
   adding the domain to a list of identified domains based on a determination that the at least one of a purpose and a category corresponds to at least one of the purpose and the category associated with the domain profile; and
   outputting the list of identified domains for display in response to the query.

2. The computer-implemented method of claim 1, wherein the technical data comprises one or more of:
   average time to render the content;
   a geographical location of a webserver associated with at least one of the first webpage or the plurality of additional webpages;
   a domain name associated with at least one of the first webpage or the plurality of additional webpages;
   a registrar reseller associated with at least one of the first webpage or the plurality of additional webpages;

an absence of a specified data type in at least one of the first webpage or the plurality of additional webpages;
an alternate publisher of at least one of the first webpage or the plurality of additional webpages;
a social community identifier associated with at least one of the first webpage or the plurality of additional webpages; or
a data type in at least one of the first webpage or the plurality of additional webpages.

3. The computer-implemented method of claim 1, wherein the content comprises one or more of images, video, audio, or executable code.

4. The computer-implemented method of claim 1, further comprising:
determining a status of the first webpage by attempting to load the first webpage; and
determining statuses of the plurality of additional webpages by attempting to load the plurality of additional webpages.

5. The computer-implemented method of claim 4, wherein determining the purpose of the domain further comprises determining the purpose of the domain based on the status of the first webpage and the statuses of the plurality of additional webpages.

6. The computer-implemented method of claim 4, wherein the domain profile further comprises an indication of the status of the first webpage and the statuses of the plurality of additional webpages.

7. The computer-implemented method of claim 1, further comprising:
comparing hyperlinks in the first webpage with predetermined data;
prioritizing the hyperlinks based on the comparing; and
selecting the plurality of additional webpages based on the prioritization.

8. The computer-implemented method of claim 1, wherein the content comprises heading, title, and description content;
wherein processing the content through the signature marker set to determine a contextual match further comprises assigning weights to the heading, title, and description content; and
wherein the contextual match is further determined based on the weights.

9. The computer-implemented method of claim 1, further comprising determining measures of domain traffic associated with the domain, wherein the contextual match is further determined based on the measures.

10. A system, comprising:
a processing system comprising one or more processors; and
a memory system comprising one or more non-transitory computer-readable media, wherein the one or more non-transitory computer-readable media contain instructions that, when executed by the processing system, cause the processing system to perform operations comprising:
receiving a first webpage associated with a domain;
determining a plurality of additional webpages associated with the domain based on hyperlinks in the first webpage;
extracting content from the first webpage and the plurality of additional webpages;
determining technical data associated with the first webpage and the plurality of additional webpages;
processing the content and the technical data through a signature marker set to determine a contextual match;
determining a purpose of the domain based on the contextual match;
determining, based on the content, a category associated with the domain, wherein the category is distinct from the purpose and defines a commercial sector of the domain;
generating a domain profile for the domain, wherein the domain profile comprises an indication of the purpose of the domain and an indication of the category associated with the domain; and
storing, in the one or more non-transitory computer-readable media, the domain profile;
receiving a query comprising at least one of a purpose and a category;
adding the domain to a list of identified domains based on a determination that the at least one of a purpose and a category corresponds to at least one of the purpose and the category associated with the domain profile; and
outputting the list of identified domains for display in response to the query.

11. The system of claim 10, wherein the technical data comprises one or more of:
average time to render the content;
a geographical location of a webserver associated with at least one of the first webpage or the plurality of additional webpages;
a domain name associated with at least one of the first webpage or the plurality of additional webpages;
a registrar reseller associated with at least one of the first webpage or the plurality of additional webpages;
an absence of a specified data type in at least one of the first webpage or the plurality of additional webpages;
an alternate publisher of at least one of the first webpage or the plurality of additional webpages;
a social community identifier associated with at least one of the first webpage or the plurality of additional webpages; or
a data type in at least one of the first webpage or the plurality of additional webpages.

12. The system of claim 10, wherein the content comprises one or more of images, video, audio, or executable code.

13. The system of claim 10, the operations further comprising:
determining a status of the first webpage by attempting to load the first webpage; and
determining statuses of the plurality of additional webpages by attempting to load the plurality of additional webpages.

14. The system of claim 13, wherein determining the purpose of the domain further comprises determining the purpose of the domain based on the status of the first webpage and the statuses of the plurality of additional webpages.

15. The system of claim 13, wherein the domain profile further comprises an indication of the status of the first webpage and the statuses of the plurality of additional webpages.

16. The system of claim 10, the operations further comprising:
comparing hyperlinks in the first webpage with predetermined data;
prioritizing the hyperlinks based on the comparing; and selecting the plurality of additional webpages based on the prioritization.

17. The system of claim 10, wherein the content comprises heading, title, and description content;
   wherein processing the content through the signature marker set to determine a contextual match further comprises assigning weights to the heading, title, and description content; and
   wherein the contextual match is further determined based on the weights.

18. The system of claim 10, the operations further comprising determining measures of domain traffic associated with the domain, wherein the contextual match is further determined based on the measures.

* * * * *